United States Patent
Tokuda et al.

(10) Patent No.: US 11,894,574 B2
(45) Date of Patent: Feb. 6, 2024

(54) BATTERY PACK

(71) Applicants: Takashi Tokuda, Nagoya (JP); Kazumasa Haji, Tokai (JP)

(72) Inventors: Takashi Tokuda, Nagoya (JP); Kazumasa Haji, Tokai (JP)

(73) Assignees: TOYOTA JIDOSHA KABUSHIKI KAISHA, Toyota (JP); Matsuo Industries. Inc., Obu (JP)

( * ) Notice: Subject to any disclaimer, the term of this patent is extended or adjusted under 35 U.S.C. 154(b) by 83 days.

(21) Appl. No.: 17/450,185

(22) Filed: Oct. 7, 2021

(65) Prior Publication Data
US 2022/0173478 A1  Jun. 2, 2022

(30) Foreign Application Priority Data

Nov. 30, 2020 (JP) ................. 2020-198450

(51) Int. Cl.
*H01M 50/367* (2021.01)
*H01M 50/209* (2021.01)
(Continued)

(52) U.S. Cl.
CPC ....... *H01M 50/367* (2021.01); *H01M 50/209* (2021.01); *H01M 50/249* (2021.01);
(Continued)

(58) Field of Classification Search
CPC ............. H01M 50/367; H01M 50/249; H01M 50/502; H01M 50/209; H01M 50/394; H01M 50/271; H01M 2220/20
See application file for complete search history.

(56) References Cited

U.S. PATENT DOCUMENTS

2014/0256178 A1* 9/2014 Kinoshita ............... B60R 16/04
  439/529
2015/0246650 A1* 9/2015 Nakajima ............. B60R 16/033
  180/68.5
(Continued)

FOREIGN PATENT DOCUMENTS

JP  2005-285777 A    10/2005
JP  2018029014  *  2/2018
(Continued)

*Primary Examiner* — Matthew T Martin
*Assistant Examiner* — Taylor Harrison Krone
(74) *Attorney, Agent, or Firm* — Oblon, McClelland, Maier & Neustadt, L.L.P.

(57) ABSTRACT

A battery pack is provided with a check valve including a cover body that is attached to a housing accommodating battery cells and a valve main body that is provided at an inner side of the cover body. The check valve exhausts gas discharged from the battery cells to outside the housing. The valve main body includes a moving portion disposed at an upstream side of the cover body. The moving portion is urged by an urging member to separate to the upstream side from the main body portion. When an internal pressure of the housing is at least a threshold value, the moving portion moves to the downstream side in opposition to urging force of the urging member. Plural stopper portions of the moving portion abut against the main body portion and limit the movement to the downstream side. Interstitial flow paths for the gas are formed between the stopper portions.

10 Claims, 13 Drawing Sheets

(51) Int. Cl.
    *H01M 50/30*         (2021.01)
    *H01M 50/271*      (2021.01)
    *H01M 50/502*      (2021.01)
    *H01M 50/249*      (2021.01)

(52) U.S. Cl.
    CPC ....... *H01M 50/271* (2021.01); *H01M 50/394* (2021.01); *H01M 50/502* (2021.01); *H01M 2220/20* (2013.01)

(56) References Cited

U.S. PATENT DOCUMENTS

| | | | |
|---|---|---|---|
| 2018/0138479 A1* | 5/2018 | Yamachi | F16K 31/22 |
| 2019/0198835 A1 | 6/2019 | Oki et al. | |
| 2021/0396323 A1* | 12/2021 | Nakayama | F16K 15/148 |

FOREIGN PATENT DOCUMENTS

| | | | |
|---|---|---|---|
| JP | 2019-117718 A | | 7/2019 |
| JP | 2020170618 | * | 10/2020 |

* cited by examiner

BATTERY PACK

CROSS-REFERENCE TO RELATED APPLICATION

This application claims priority under 35 USC 119 from Japanese Patent Application No. 2020-198450 filed on Nov. 30, 2020, the disclosure of which is incorporated by reference herein in its entirety.

BACKGROUND

Technical Field

The present disclosure relates to a battery pack.

Related Art

A battery device for a vehicle that has been known since heretofore (for example, see Japanese Patent Application Laid-Open (JP-A) No. 2019-117718) is equipped with a battery pack, a venting duct and a check valve. The battery pack includes battery cells provided with outgassing portions that exhaust gas from inside the battery cells. The battery pack is mounted at a vehicle and supplies electric power to an electric motor for driving the vehicle. The venting duct is connected to the battery pack and exhausts gas to the exterior of the vehicle. The check valve is provided at the venting duct and suppresses flows of gas toward the battery pack from outside the vehicle.

SUMMARY

When pressure inside the battery pack (a housing) rises due to the battery pack being filled with gas produced from the battery cells, the gas passes through a flow path formed in the check valve and is exhausted to the exterior of the vehicle.

However, there is scope for improvement in regard to assuring a flow path in the check valve that, when exhausting gas in the housing, restrains a rise in pressure (internal pressure) in the housing while suppressing a loss of pressure required for exhausting the gas.

Accordingly, an object of the present disclosure is to provide a battery pack that may assure a flow path in a check valve that, when exhausting gas that is produced from battery cells and fills the interior of a housing, restrains a rise in pressure inside the housing while suppressing a loss of pressure required for exhausting the gas.

Solution to Problem

In order to achieve the object described above, a battery pack according to a first aspect includes: a battery stack including a plurality of battery cells arrayed in a thickness direction; a housing accommodating the battery stack in a hermetically sealed state; and a check valve including a cover body that is attached to the housing and a valve main body that is provided at an inner side of the cover body, the check valve exhausting gas discharged from the plurality of battery cells to outside the housing, wherein the valve main body includes: a main body portion fixed at the cover body at a downstream side in an exhaust direction of the gas; and a moving portion disposed at the cover body at an upstream side in the exhaust direction of the gas, the moving portion being urged by an urging member to separate to the upstream side from the main body portion, and when an internal pressure of the housing is at least a threshold value due to the gas, the moving portion moving to the downstream side in opposition to an urging force of the urging member and forming a flow path for the gas between the cover body and the moving portion, and wherein the moving portion includes a plurality of stopper portions that abut against the main body portion and limit the movement to the downstream side, the moving portion forming an interstitial flow path between the stopper portions that is in fluid communication with the flow path.

According to the battery pack according to the first aspect, when the internal pressure of the housing is at or above the threshold value due to gas exhausted from the plurality of battery cells, the moving portion of the valve main body structuring the check valve moves to the downstream side of the exhaust direction of the gas, in opposition to the urging force of the urging member, forming the flow path for the gas between the moving portion and the cover body. The plural stopper portions that limit the movement of the moving portion to the downstream side by abutting against the main body portion structuring the check valve are provided at the moving portion. Interstitial flow paths that are continuous with the above-mentioned flow path are formed between the stopper portions. That is, the interstitial flow paths with small openings are assured in the check valve subsequent to the flow path that is formed between the cover body and the moving portion. Therefore, when gas that is produced from the battery cells and fills the interior of the housing is being exhausted, a rise in pressure inside the housing may be restrained while a loss of pressure required for exhausting the gas is suppressed.

In a battery pack according to a second aspect, in the battery pack according to the first aspect, the cover body includes a guide portion that guides the moving portion to move along the exhaust direction.

According to the battery pack according to the second aspect, the cover body includes the guide portion that guides the moving portion so as to move along the exhaust direction. Therefore, the moving portion moves without tilting relative to the exhaust direction. As a result, the flow path for the gas between the cover body and the moving portion is formed precisely.

In a battery pack according to a third aspect, in the battery pack according to the second aspect, the guide portion is formed in a substantially semicircular shape in a sectional view seen in the exhaust direction.

According to the battery pack according to the third aspect, guide portions are formed in the substantially semicircular shape in the sectional view seen in the exhaust direction. Therefore, a cross-sectional area of the flow channel for the gas formed between the cover body and the moving portion is increased compared to a structure in which the guide portions are formed in rectangular shapes in the sectional view seen in the exhaust direction.

In a battery pack according to a fourth aspect, in the battery pack according to any one of the first to third aspects, the stopper portions are formed in rectangular shapes as seen in a direction intersecting the exhaust direction.

According to the battery pack according to the fourth aspect, each stopper portion is formed in a rectangular shape as seen in a direction intersecting the exhaust direction. Therefore, an abutting attitude of the stopper portion against the main body portion of the moving portion is more stable than in a structure in which each stopper portion is formed in a substantially semicircular shape as seen in the direction intersecting the exhaust direction.

In a battery pack according to a fifth aspect, in the battery pack according to any one of the first to fourth aspects, the moving portion includes a ring portion of which an axial direction is in the exhaust direction, and a ventilation membrane is provided at an aperture portion of the ring portion, the ventilation membrane allowing air to pass therethrough and not allowing the gas to pass therethrough.

According to the battery pack according to the fifth aspect, the moving portion includes the ring portion whose axial direction is in the exhaust direction, and the ventilation membrane provided at the aperture portion of the ring portion is permeable to air but impermeable to the gas. Therefore, while the internal pressure of the housing is below the threshold value, air in the housing is smoothly exhausted through the ventilation membrane due to the gas being exhausted from the battery cells. When the internal pressure of the housing is at or above the threshold value, the gas passes through the interstitial flow paths formed between the stopper portions due to the gas being exhausted from the battery cells, and a reverse flow through the ventilation membrane into the housing of the gas that has passed through the interstitial flow paths is prevented.

In a battery pack according to a sixth aspect, in the battery pack according to any one of the first to fifth aspects, the battery stack is an auxiliary power source.

According to the battery pack according to the sixth aspect, the battery stack is an auxiliary power source. Therefore, when the battery pack is mounted in, for example, a self-driving vehicle, even if a main power source ceases to function due to a malfunction or the like, running for some distance is possible. Thus, the self-driving vehicle may be moved to a safe location.

In a battery pack according to a seventh aspect, the battery pack according to any one of the first to sixth aspects further includes a reinforcing member disposed inside the housing, the reinforcing member being formed in a frame shape capable of accommodating the battery stack at an inner side thereof, wherein a connecting portion extending in the thickness direction is disposed at an upper end portion of the reinforcing member.

According to the battery pack according to the seventh aspect, the connecting portion that extends in the thickness direction of the battery cells is disposed at the upper end portion of the reinforcing member disposed inside the housing. Therefore, even when a load is applied in the thickness direction of the battery cells, the connecting portion acts as a bracing rod and withstand load performance is assured.

In a battery pack according to an eighth aspect, the battery pack according to any one of the first to seventh aspects further includes: a side lid portion that closes off an opening portion formed in one side portion of the housing; and an upper lid portion that closes off an opening portion formed in an upper portion of the housing, wherein the side lid portion includes an engaged portion with which an engaging portion formed at the upper lid portion engages.

According to the battery pack according to the eighth aspect, the side lid portion includes the engaged portion with which the engaging portion formed at the upper lid portion is engaged. Therefore, compared with a structure in which a housing includes an engaged portion with which an engaging portion formed at an upper lid portion is engaged, a height of the housing is reduced, and the size of the battery pack is reduced by a corresponding amount.

In a battery pack according to a ninth aspect, the battery pack according to any one of the first to eighth aspects further includes: a side lid portion that closes off an opening portion formed in one side portion of the housing; and a busbar that electrically connects an electrode terminal provided at the battery stack with an electrode terminal provided at the side lid portion, wherein the side lid portion includes a tilting prevention portion that prevents tilting of the busbar at a time of attachment of the busbar.

According to the battery pack according to the ninth aspect, the side lid portion includes the tilting prevention portion that prevents tilting of the busbar at the time of attachment of the busbar. Therefore, ease of operation of attaching the busbar is improved compared with a structure in which a side lid portion does not include a tilting prevention portion.

In a battery pack according to a tenth aspect, in the battery pack according to the ninth aspect, the tilting prevention portion includes a slit portion into which a pawl portion formed at the busbar is inserted.

According to the battery pack according to the tenth aspect, the tilting prevention portion is structured by the slit portion into which the pawl portion formed at the busbar is inserted. Therefore, the structure of the tilting prevention portion is simplified compared with a structure in which a tilting prevention portion is separately provided.

Effects

According to the present disclosure as described above, a flow path may be assured in a check valve that, when exhausting gas that is produced from battery cells and fills the interior of a housing, restrains a rise in pressure inside the housing while suppressing a loss of pressure required for exhausting the gas.

BRIEF DESCRIPTION OF THE DRAWINGS

Preferred embodiments will be described in detail based on the following figures, wherein.

DETAILED DESCRIPTION

Figure 1:
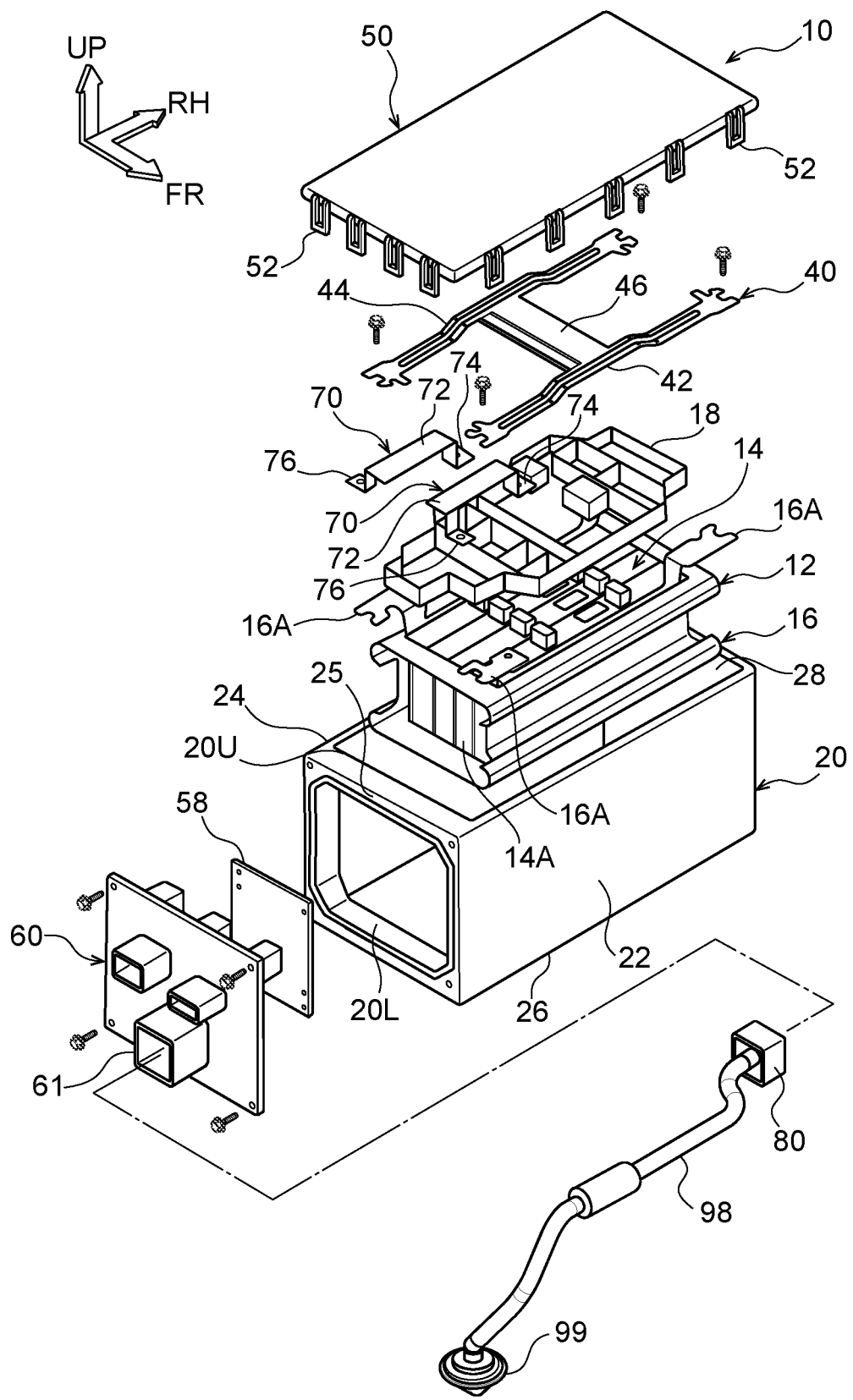
FIG. 1 is an exploded perspective view showing a battery pack according to a present exemplary embodiment.

Below, an exemplary embodiment of the present disclosure is described in detail in accordance with the drawings. A battery pack 10 (see FIG. 1) according to the present exemplary embodiment is an auxiliary power source to be mounted at a self-driving vehicle (not shown in the drawings) that runs under electric power. That is, the battery pack 10 is a backup power source for enabling the self-driving vehicle to run some distance if a battery stack that is a main power source (not shown in the drawings) ceases to function due to a malfunction or the like.

For convenience of description, the arrow UP that is shown where appropriate in the drawings represents an upper direction of the battery pack 10, an arrow FR represents a front direction of the battery pack 10, and an arrow RH represents a right direction of the battery pack 10. Therefore, where the directions upper and lower, front and rear, and left and right are recited without being particularly specified in the descriptions below, these represent upper and lower in a vertical direction of the battery pack 10, front and rear in a front-and-rear direction of the battery pack 10, and left and right in a left-and-right direction of the battery pack 10.

Figure 2:
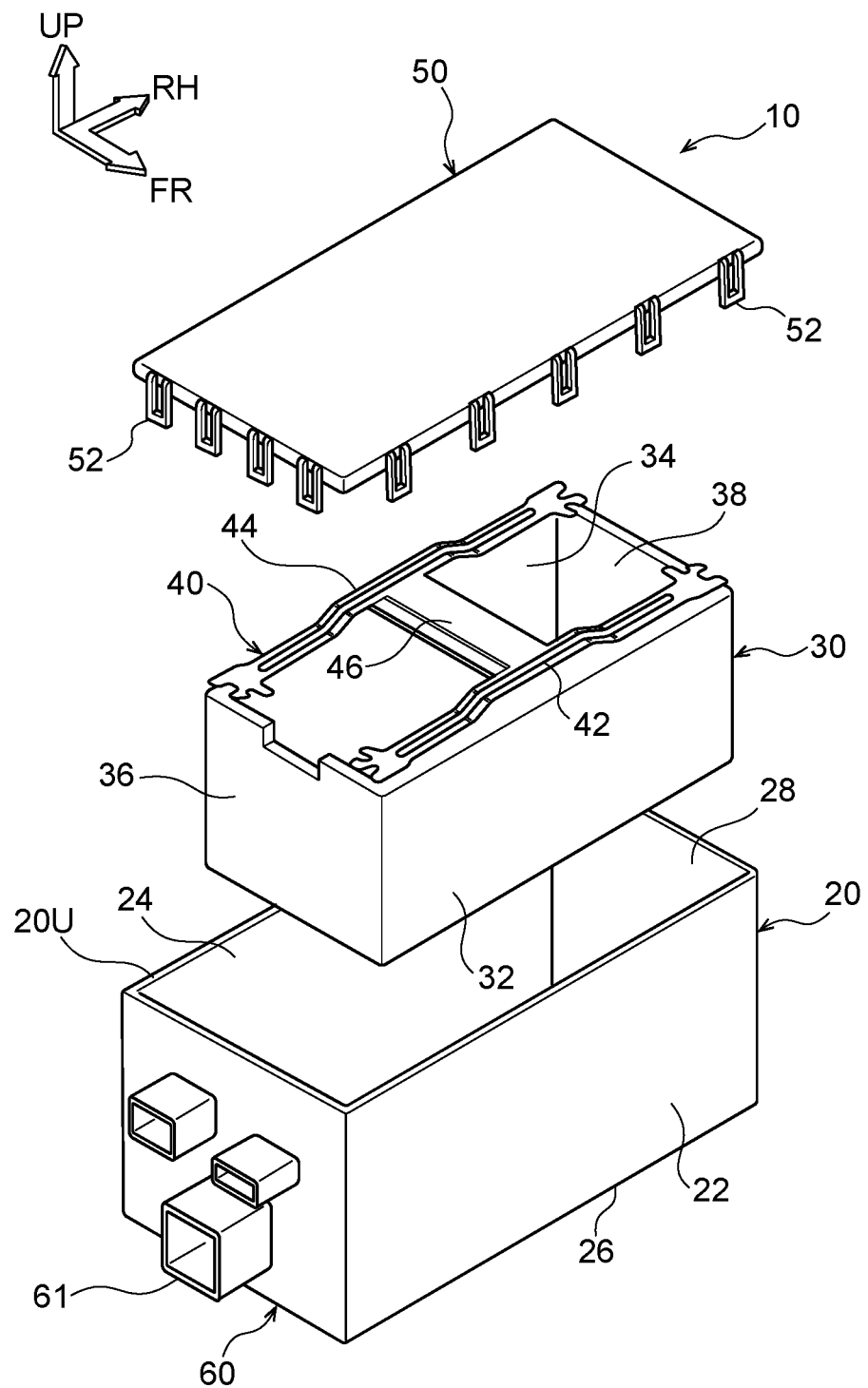
FIG. 2 is an exploded perspective view showing a reinforcing member provided in a case of the battery pack according to the present exemplary embodiment.

As shown in FIG. 1 and FIG. 2, the battery pack 10 according to the present exemplary embodiment includes a case 20, a reinforcing member 30 (not shown in FIG. 1), a battery stack 12 (not shown in FIG. 2), a busbar module 18 and a flue plate 40. The case 20 is fabricated of resin and serves as a housing. The reinforcing member 30 is fabricated of metal and is arranged along an inner face of the case 20. The battery stack 12 is accommodated at an inner side of the reinforcing member 30 (inside the case 20). The busbar module 18 is provided above the battery stack 12. The flue plate 40 is disposed above the busbar module 18 and serves as a metal plate.

The battery pack 10 according to the present exemplary embodiment further includes a cover member 50, a connector module 60, a monitoring circuit board 58 and a check valve 80. The cover member 50 is fabricated of resin and serves as an upper lid portion that is capable of closing off an opening portion 20U formed in an upper portion of the case 20. The connector module 60 is fabricated of resin and serves as a side lid portion that is capable of closing off an opening portion 20L formed in one side portion (a left side portion) of the case 20. The monitoring circuit board 58 is disposed at the inner side of the connector module 60. The check valve 80 is attached to the outer side of the connector module 60.

The case 20 is formed of a resin material such as, for example, polybutylene terephthalate (PBT) or the like. The case 20 includes a floor wall 26 in a rectangular flat plate shape, a front wall 22 and rear wall 24 in rectangular flat plate shapes, and a right side wall 28 in a rectangular flat plate shape. The longer direction of the floor wall 26 is in the left-and-right direction. The longer directions of the front wall 22 and rear wall 24 are in the left-and-right direction. The longer direction of the right side wall 28 is in the front-and-rear direction. The right side wall 28 corresponds to another side portion (a right side portion).

The left side portion of the case 20 is formed as the opening portion 20L. Upper-left end portions of the front wall 22 and the rear wall 24 are integrally connected by a long, narrow connecting member 25. Thus, the left side portion of the case 20 is formed in a rectangular frame shape. The connector module 60 is attached by screw-fixing or the like to the left side portion formed in this rectangular frame shape. The connector module 60 is formed substantially in a rectangular flat plate shape of a resin material such as, for example, polyphenylene sulfide (PPS) or the like. Thus, the left side portion is closed off.

As shown in FIG. 2, the reinforcing member 30 includes a front wall 32, a rear wall 34, a right side wall 38 and a left side wall 36. The front wall 32 is arranged along an inner face of the front wall 22, the rear wall 34 is arranged along an inner face of the rear wall 24, the right side wall 38 is arranged along an inner face of the right side wall 28, and the left side wall 36 opposes an inner face of the connector module 60. That is, the reinforcing member 30 is formed in a rectangular frame shape (a quadrangular tube shape) that is open in the vertical direction.

The front wall 32 and rear wall 34 of the reinforcing member 30 are formed of, for example, steel plate with a thickness of 1.4 mm, and the left side wall 36 and right side wall 38 are formed of, for example, aluminium plate with a thickness of 5.5 mm. Respective left and right end portions of the reinforcing member 30 and the rear wall 34 are attached to respective front end faces and rear end faces of the left side wall 36 and right side wall 38 by screw-fixing or the like.

The flue plate 40 is disposed at an upper end portion of the front wall 32 and an upper end portion of the rear wall 34 of the reinforcing member 30. The flue plate 40 is formed in a substantial "H" shape in plan view of, for example, steel plate with a thickness of around 2.0 mm. A front arm 42 and a rear arm 44 of the flue plate 40 extend in the left-and-right direction. Respective left and right end portions of the front arm 42 and the rear arm 44 are attached by screw-fixing or the like both to arms 16A protruding from a holder 16, which is described below, and to the upper end portion of the left side wall 36 and upper end portion of the right side wall 38 of the reinforcing member 30.

A connecting portion 46 connects left-and-right direction central portions of the front arm 42 and rear arm 44 of the flue plate 40 (extending in a thickness direction of battery cells 14, which are described below). The connecting portion 46 is disposed between a left-and-right direction central portion of the upper end portion of the front wall 32 and a left-and-right direction central portion of the upper end portion of the rear wall 34. The front arm 42 and the rear arm 44 are formed with a width of the front arm 42 and a width of the rear arm 44 being the same. The connecting portion 46 is formed with a width greater than the widths of the front arm 42 and the rear arm 44.

Figure 3:
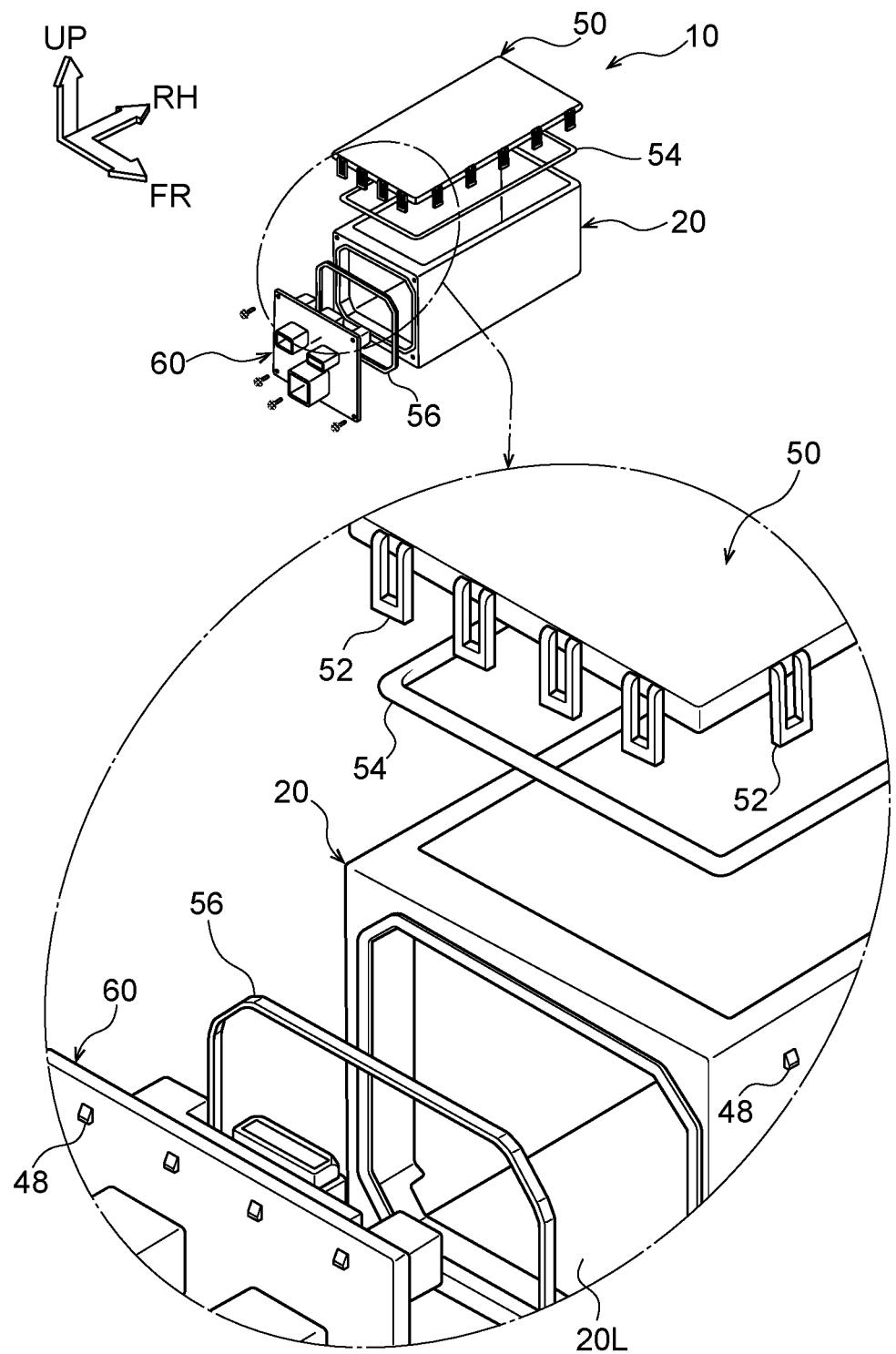
FIG. 3 is an exploded perspective view showing a magnification of engaging portions of a cover member of the battery pack according to the present exemplary embodiment and engaged portions of a connector module.

The cover member 50 is formed in a rectangular flat plate shape with substantially the same size as the floor wall 26 of, for example, a resin material such as polyphenylene sulfide (PPS) or the like. As shown in more detail in FIG. 3, plural engaging portions 52 are equidistantly formed integrally at a periphery edge portion of the cover member 50. The engaging portions 52 depend in substantial "U" shapes. Five of the engaging portions 52 are provided at each longer side portion of the cover member 50 and four of the engaging portions 52 are provided at each shorter side portion.

Plural pawl portions 48 are integrally formed at upper end portions of the respective outer faces of the front wall 22, rear wall 24 and right side wall 28 of the case 20. The pawl portions 48 serve as engaged portions with which the respective engaging portions 52 engage. Five of the pawl portions 48 are equidistantly formed at the upper end portions of the outer faces of each of the front wall 22 and the rear wall 24, and four of the pawl portions 48 are equidistantly formed at the upper end portion of the outer face of the right side wall 28. A plural number of the pawl portions 48 are also integrally formed at an upper end portion of an outer face of the connector module 60. These pawl portions 48 also serve as engaged portions with which the engaging portions 52 engage. That is, four of the pawl portions 48 are equidistantly formed at the upper end portion of the outer face of the connector module 60.

A front and rear pair of pins (not shown in the drawings) protrude toward the connecting member 25 from upper end portions of the inner face of the connector module 60. A front and rear pair of fitting holes (not shown in the drawings) are formed in the connecting member 25. The front and rear pair of pins tightly fit into the front and rear pair of fitting holes. Thus, by the pins being tightly fitted into the fitting holes, the connector module 60 is positioned relative to the left side portion of the case 20 and is attached thereto. As a result, the engaging portions 52 formed at the cover member 50 are engaged with the pawl portions 48 formed at the connector module 60 without mispositioning.

An O-ring 54 that serves as a sealing member is provided between the cover member 50 and the upper end portions of the case 20. The O-ring 54 is formed in a rectangular shape in plan view and is arranged along the upper end portions of the front wall 22, the rear wall 24, the right side wall 28 and the connecting member 25. Similarly, an O-ring 56 that serves as a sealing member is provided between the connector module 60 and left side portions of the case 20. The O-ring 56 is formed in a rectangular shape in side view and is arranged along periphery edge portions of the connector module 60 (left end portions of the floor wall 26, front wall 22 and rear wall 24, and the connecting member 25).

Thus, by the cover member 50 being attached to the case 20 with the O-ring 54 interposed and the connector module 60 being attached to the case 20 with the O-ring 56 interposed, the case 20 fabricated of resin that accommodates the battery stack 12 and so forth is formed as a structure that is hermetically sealed in a waterproof and dustproof state.

As shown in FIG. 1, the battery stack 12 includes a plural number (for example, four) of lithium battery cells (below referred to simply as "the battery cells") 14 and the frame-shaped holder 16 that accommodates the plural battery cells 14. The upper side and both the left and right sides of the holder 16 are open. Each battery cell 14 includes a case 14A that is fabricated of metal (for example, aluminium) and formed in a substantially cuboid shape. The plural battery cells 14 are accommodated side-by-side in the front-and-rear direction in the holder 16, with a thickness direction of the battery cells 14 in the front-and-rear direction. The battery cells 14 are electrically connected in series by the busbar module 18 provided above the battery cells 14. A thermistor and the like are provided at the busbar module 18.

Figure 4:
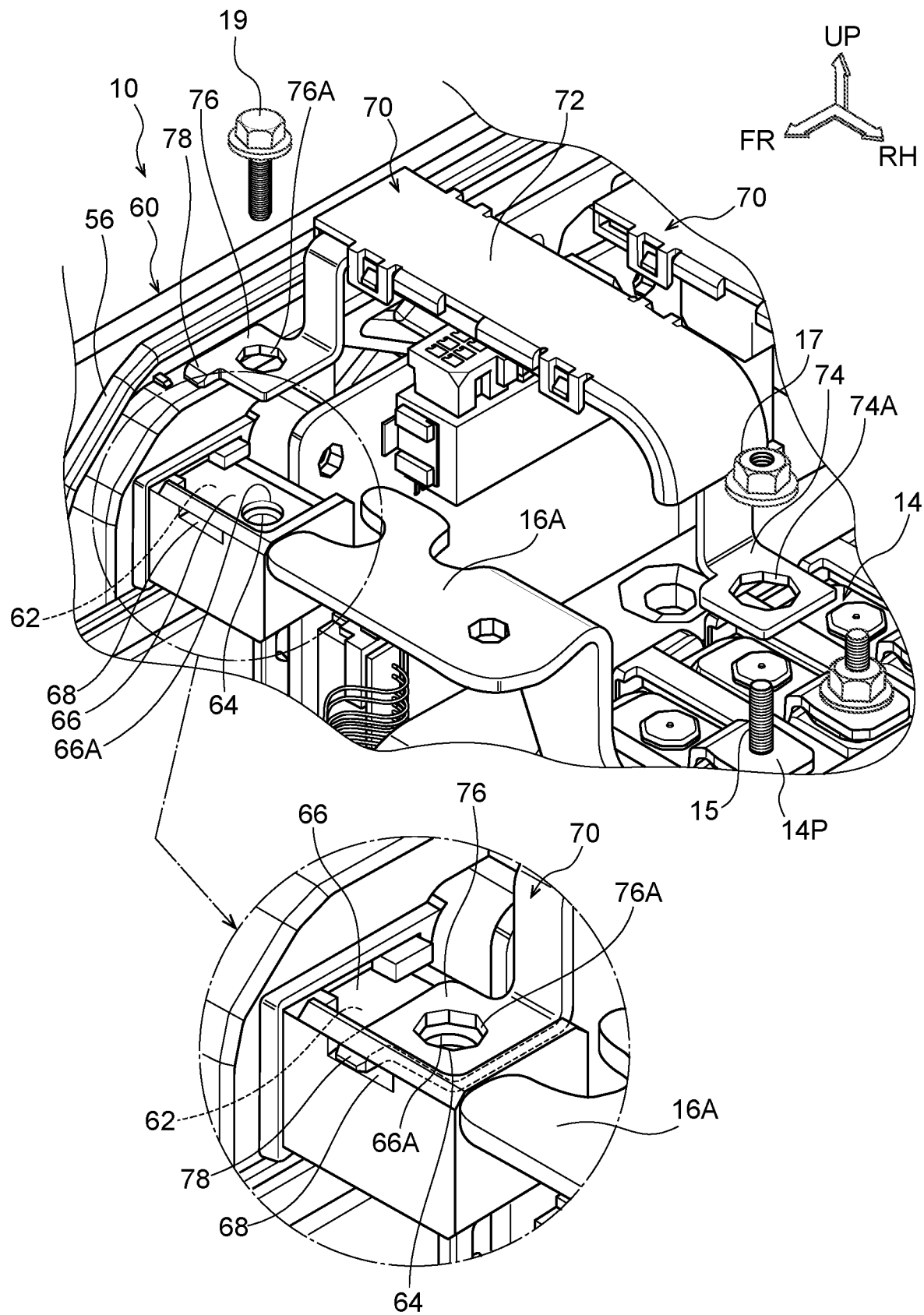
FIG. 4 is an exploded perspective view showing a magnification of a connecting structure of a busbar that electrically connects a battery stack of the battery pack according to the present exemplary embodiment with the connector module.

As shown in FIG. 4, a positive electrode terminal 14P at one side in the front-and-rear direction (for example, the front side) of the battery cells 14 and a negative electrode terminal (not shown in the drawings) at the other side in the front-and-direction (for example, the rear side) of the battery cells 14 are electrically connected by a front and rear pair of busbars 70 to respective electrode terminals 66 provided at the connector module 60.

Each busbar 70 includes a main body portion 72 in a long, narrow, substantially rectangular, flat plate shape, a first connecting portion 74 and a second connecting portion 76. The first connecting portion 74 integrally depends from one length direction end portion (a right end portion) of the main body portion 72 and is formed in a curved shape. The second connecting portion 76 integrally depends from one longer edge portion side of the main body portion 72 at the other length direction end portion (a left end portion) of the main body portion 72.

The first connecting portion 74 of the busbar 70 is formed in a substantial "L" shape as seen in the direction along the shorter edge portions of the busbar 70 (the front-and-rear direction). A penetrating hole 74A with a substantially circular shape (more specifically, a regular octagon shape) is formed in a distal end portion of the first connecting portion 74. An axial direction of the penetrating hole 74A is in the vertical direction.

A weld bolt 15 is provided at the positive electrode terminal 14P of the battery cell 14 at the front side, and a weld bolt (not shown in the drawings) is provided at the negative electrode terminal of the battery cell 14 at the rear side. The weld bolts are inserted into the respective penetrating holes 74A of the first connecting portions 74. A nut 17 is screwed onto the weld bolt 15 from the upper side thereof. In this manner, the respective first connecting portions 74 of the busbars 70 are connected to the positive electrode terminal 14P of the battery cell 14 at the front side and the negative electrode terminal of the battery cell 14 at the rear side.

The second connecting portions 76 of the busbars 70 depend so as to protrude in opposite directions from one another (the front direction and the rear direction). Each second connecting portion 76 is formed in a substantial "L" shape as seen in the direction along the longer side portions of the busbar 70 (the left-and-right direction). A penetrating hole 76A with a substantially circular shape (more specifically, a regular octagon shape) is formed in a distal end portion of the second connecting portion 76. The axial direction of the penetrating hole 76A is in the vertical direction. A pawl portion 78 in a rectangular flat plate shape is formed integrally with the distal end portion of the second connecting portion 76. The pawl portion 78 extends in the protruding direction of the second connecting portion 76.

A front and rear pair of accommodating recess portions 62 with substantially rectangular shapes in plan view are formed in the upper portion of the inner face of the connector module 60. The electrode terminals 66 are provided in the accommodating recess portions 62. Each electrode terminal 66 is fabricated of metal and electrically connected with the corresponding second connecting portion 76. A penetrating hole 66A with a substantially circular shape is formed in the electrode terminal 66. A female thread portion 64 is formed in a floor portion of the accommodating recess portion 62 with an axial direction of the female thread portion 64 in the vertical direction. The penetrating hole 66A is in communication with the female thread portion 64, and a bolt 19 is screwed into the female thread portion 64.

A slit portion 68 is formed in a periphery edge portion at the front-and-rear direction outer side (the side in the protruding direction of the second connecting portion 76) of each accommodating recess portion 62. The pawl portion 78 is inserted into the slit portion 68. When each pawl portion 78 is inserted into the corresponding slit portion 68, the second connecting portion 76 is disposed at a position at which the penetrating hole 76A is in communication with the penetrating hole 66A and the female thread portion 64.

The second connecting portions 76 are provided only at one longer edge portion side of the other length direction end portion (left end portion) of each main body portion 72 and are not well-balanced between left and right. However, because the pawl portions 78 are inserted into the slit portions 68, tilting of the busbars 70 in directions in which the busbars 70 approach one another is prevented. The slit portions 68 into which the pawl portions 78 are inserted are equivalent to a tilting prevention portion.

As shown in FIG. 1, a fitting portion 61 with a rectangular frame shape is formed at a lower portion of the outer face of the connector module 60. The check valve 80 is tightly fitted and engaged with the inner side of the fitting portion 61. The check valve 80 is for exhausting gas such as carbon monoxide (CO) and the like that is discharged from the battery cells 14 due to abnormal heating and fills the interior of the case 20. One end portion of an exhaust pipe 98 is connected to the check valve 80, and the gas is exhausted to the exterior through the exhaust pipe 98. A grommet 99 is provided at the other end portion of the exhaust pipe 98. The grommet 99 prevents entry of foreign bodies from the exterior.

Now, the check valve 80 according to the present exemplary embodiment of the vehicle 10 with the structure described above is described in more detail. Below, the side of the check valve 80 at which the connector module 60 is disposed is referred to as the upstream side of the exhaust direction of the gas (and simply as "the upstream side" below), and the side of the check valve 80 at which the exhaust pipe 98 is disposed is referred to as the downstream side of the exhaust direction of the gas (and simply as "the downstream side" below).

As shown in FIG. 5 to FIG. 11, the check valve 80 includes a cover body 82 and a valve main body 92. The cover body 82 is attached to the fitting portion 61 of the connector module 60. The valve main body 92 is provided inside the cover body 82 (and attached to the cover body 82).

As shown in FIG. 5, FIG. 6, FIG. 9 and FIG. 11, the cover body 82 includes an insertion wall portion 84 with a substantially rectangular flat plate shape, a pair of fitted wall portions 87, and a fitting wall portion 88. The insertion wall portion 84 is inserted into the fitting portion 61. The fitted wall portions 87 are integrally provided standing toward the downstream side from respective periphery edge portions of the insertion wall portion 84 that oppose one another. The fitted wall portion 87 is integrally provided standing toward the downstream side from a periphery edge portion of the insertion wall portion 84 that is between the pair of fitted wall portions 87.

A penetrating hole 84A is formed at a central portion of the insertion wall portion 84. A circular tube portion 83 protrudes integrally from a periphery of the penetrating hole 84A at a wall face of the insertion wall portion 84 that faces to the upstream side. The circular tube portion 83 protrudes to the opposite side of the insertion wall portion 84 (the upstream side) from the side thereof to which the fitted wall portions 87 and the fitting wall portion 88 protrude. An O-ring 83A is tightly fitted and attached to an outer periphery face of the circular tube portion 83.

An annular wall portion 86 with a predetermined height is integrally formed at a wall face of the insertion wall portion 84 that faces to the downstream side. The annular wall portion 86 is coaxial with the circular tube portion 83. A plural number (for example, four) of first spacers 85 that serve as a guide portion are formed at an upstream side end portion of an inner periphery face of the annular wall portion 86. The first spacers 85 are formed equidistantly in the peripheral direction.

Figure 9:
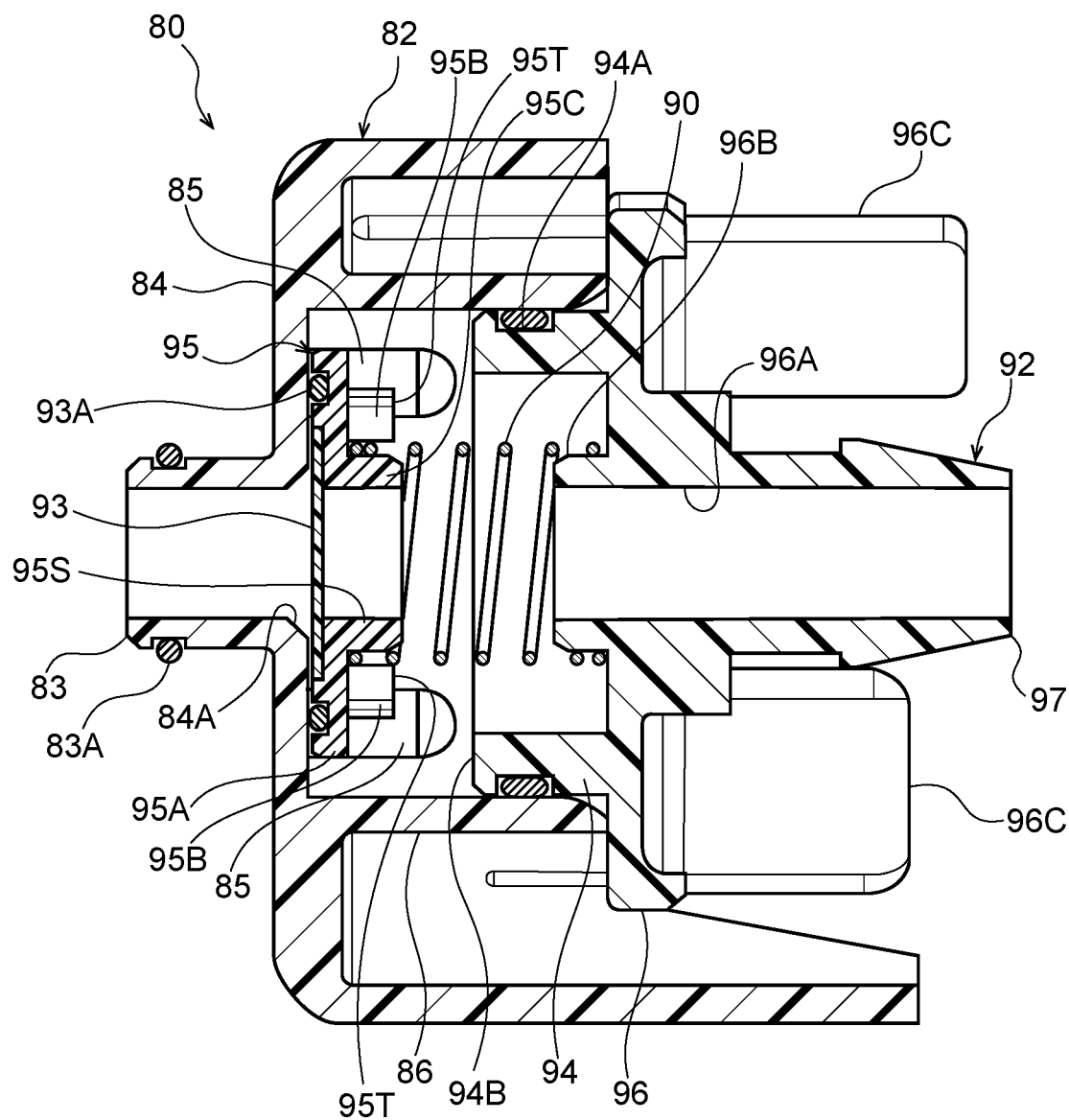
FIG. 9 is a sectional view showing the state in which the valve main body of the check valve according to the present exemplary embodiment is closed.
Figure 12A:
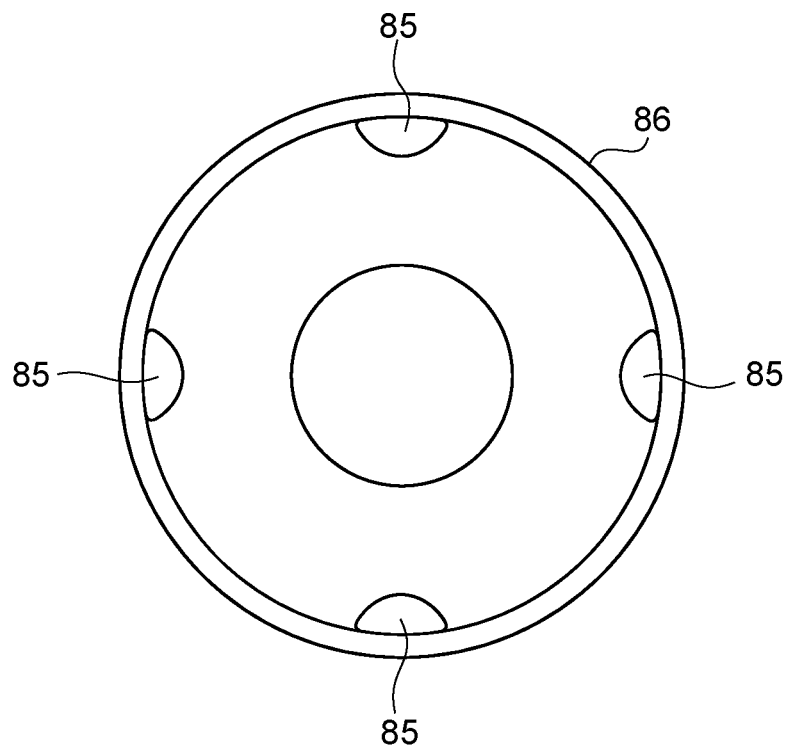
FIG. 12A is a schematic view showing cross-sectional shapes of first spacers of the cover body according to the present exemplary embodiment.

As shown in FIG. 12A, each first spacer 85 is formed substantially in a semicircular shape in a sectional view seen in the axial direction of the circular tube portion 83 (the exhaust direction of the gas), and as shown in FIG. 9, a downstream side end portion of the first spacer 85 is formed in a substantially semicircular shape as seen in a direction intersecting the axial direction of the circular tube portion 83.

The first spacers 85 are structures that touch (make line contact with) an outer periphery end face of a ring portion 95A of a moving portion 95, which is described below, only in lines along the axial direction (the exhaust direction of the gas). That is, the moving portion 95 that is described below is guided by the first spacers 85. Thus, the moving portion 95 may move along the axial direction without tilting relative to the axial direction.

Figure 5:
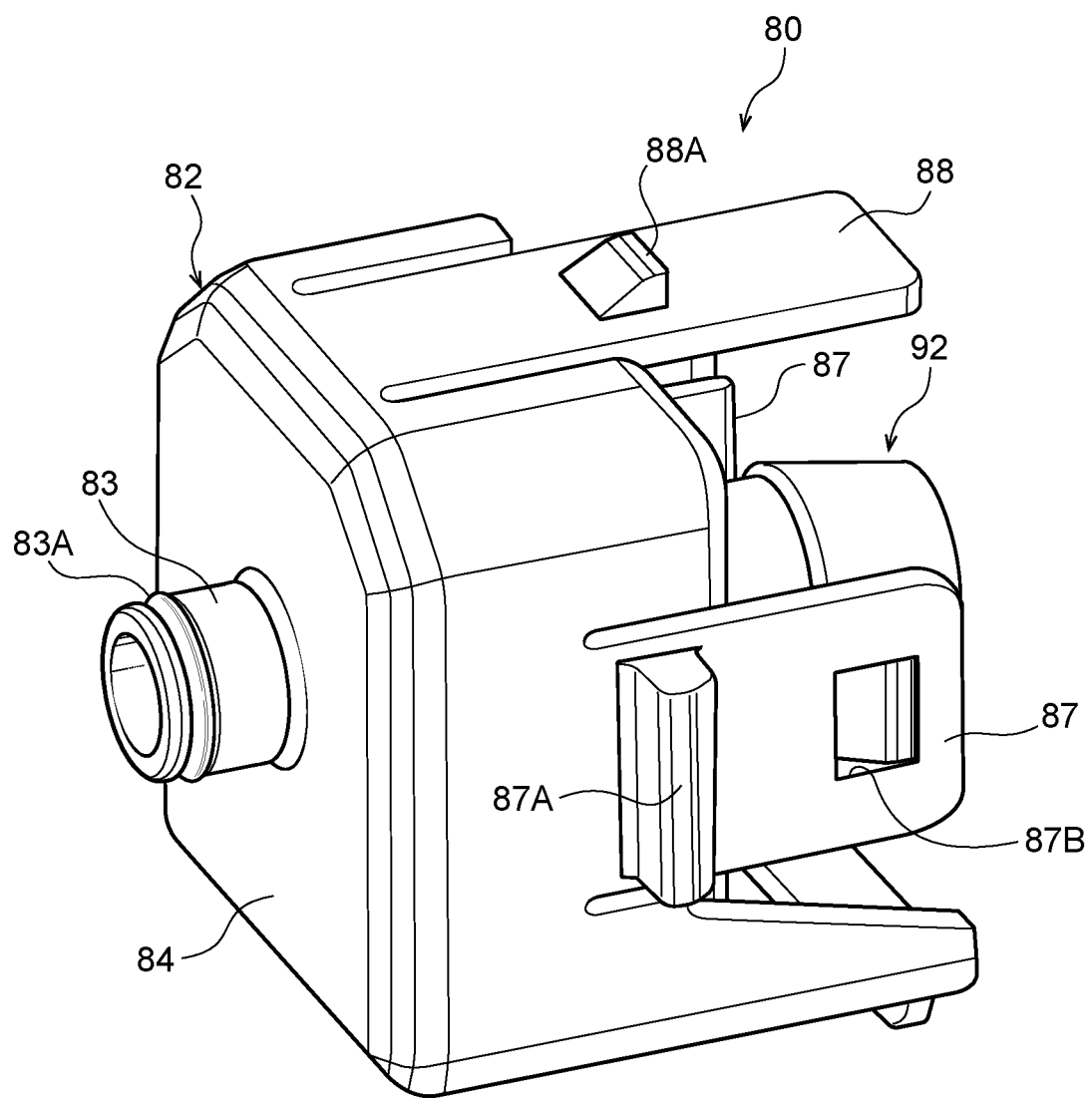
FIG. 5 is a perspective view showing a check valve of the battery pack according to the present exemplary embodiment.
Figure 6:
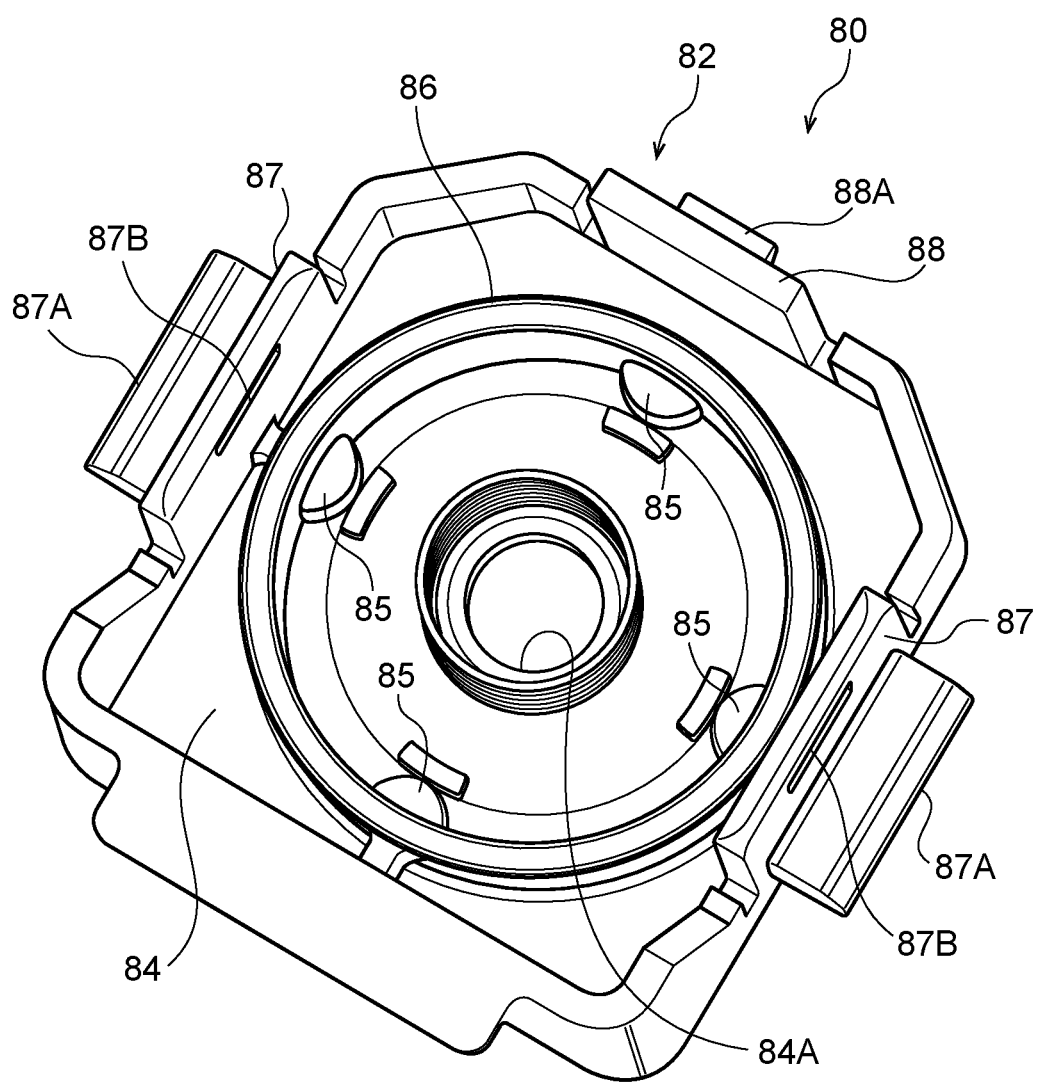
FIG. 6 is a perspective view showing an inner side of a cover body structuring the check valve according to the present exemplary embodiment.

As shown in FIG. 5 and FIG. 6, an engaging pawl 88A is integrally formed at an appropriate position of the fitting wall portion 88. The engaging pawl 88A protrudes in a direction intersecting the axial direction of the circular tube portion 83 (toward a diameter direction outer side). The engaging pawl 88A is formed substantially in a right-angled triangle shape in cross section. The engaging pawl 88A includes a perpendicular face projecting perpendicularly from the fitting wall portion 88 at the downstream side of the engaging pawl 88A. A protruding pawl 87A is formed at the upstream side of each fitted wall portion 87. The protruding pawl 87A protrudes in a direction intersecting the axial direction of the circular tube portion 83 (toward the diameter direction outer side). A distal end of the protruding pawl 87A is formed substantially in a semicircular shape in cross section.

When the cover body 82 (the check valve 80) is being inserted (tightly fitted) into the inner side of the fitting portion 61 of the connector module 60, the protruding pawls 87A are pushed toward the diameter direction inner sides of the circular tube portion 83. At the same time, the engaging pawl 88A retracts to the diameter direction inner side of the circular tube portion 83 by resilient deformation of the fitting wall portion 88 while being inserted (tightly fitted).

The engaging pawl 88A is engaged, by restoration of the resilient deformation of the fitting wall portion 88, with an engaged portion (not shown in the drawings) formed at the fitting portion 61. Thus, the check valve 80 (the cover body 82) is attached so as not to disengage from the fitting portion 61. A rectangular penetrating hole 87B is formed in each fitted wall portion 87. An engaging pawl 96D of the valve main body 92, which is described below, is engaged with the penetrating hole 87B.

As shown in FIG. 7 to FIG. 11, the valve main body 92 includes a base portion 96 and a main body portion 94 with a circular tube shape. The base portion 96 is formed in a substantially rectangular flat plate shape that is a little smaller than the insertion wall portion 84, and is disposed at the inner side of the fitted wall portions 87 and fitting wall portion 88. When the valve main body 92 is attached to the cover body 82, the main body portion 94 is disposed at the diameter direction inner side of the downstream side of the annular wall portion 86 with an axial direction of the main body portion 94 in the exhaust direction of the gas.

A penetrating hole 96A is formed in a central portion of the base portion 96. A circular tube portion 97 is integrally provided at a periphery of the penetrating hole 96A at a wall face of the base portion 96 that faces to the downstream side. The circular tube portion 97 protrudes to the opposite side of the base portion 96 (the downstream side) from the side thereof at which the circular tube portion 83 is disposed. One end portion of the exhaust pipe 98 is structured to connect in fluid communication with the circular tube portion 97.

A pair of fitting wall portions 96C are integrally provided at mutually opposing peripheral edge portions of the base portion 96. The fitting wall portions 96C each stand toward the downstream side. The engaging pawls 96D are integrally formed at appropriate positions of the fitting wall portions 96C. Each engaging pawl 96D protrudes in a direction intersecting the axial direction of the circular tube portion 97 (toward the diameter direction outer side). Thus, when the valve main body 92 is inserted and attached to the inner side of the cover body 82, the engaging pawls 96D engage with the penetrating holes 87B of the fitted wall portion 87.

When the valve main body 92 is attached to the cover body 82, the circular tube portion 83 and the circular tube portion 97 are coaxial as seen in the exhaust direction and are in fluid communication. A small circular tube portion 96B is integrally provided protruding from a wall face of the base portion 96 that faces to the upstream side. The small circular tube portion 96B is coaxial with and in fluid communication with the circular tube portion 97. A downstream side end portion (one end portion) of a compression coil spring 90, which serves as an urging member, is tightly fitted and attached to an outer periphery face of the small circular tube portion 96B.

The moving portion 95 is disposed at the upstream side relative to the main body portion 94 (the side of the main body portion 94 at which the insertion wall portion 84 is disposed). The moving portion 95 is disposed to be coaxial with the main body portion 94. The moving portion 95 includes the ring portion 95A with an annular flat plate shape, a plural number (for example, four) of second spacers 95B, and a small circular tube portion 95C. The ring portion 95A has an outer diameter smaller than an outer diameter of the main body portion 94. The second spacers 95B, which serve as stopper portions, are provided equidistantly in the peripheral direction, integrally protruding toward the downstream side from an outer periphery edge portion of the ring portion 95A. The small circular tube portion 95C is provided protruding integrally toward the downstream side from an inner periphery portion of the ring portion 95A.

Figure 13A:
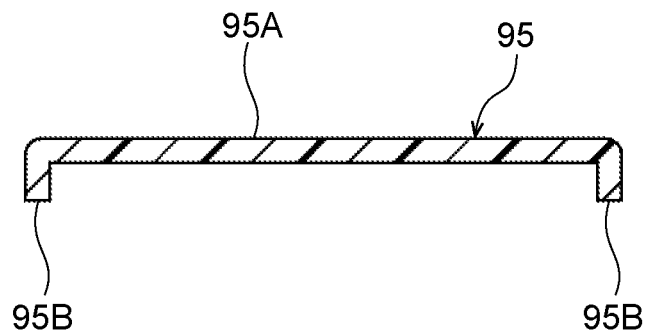
FIG. 13A is a schematic view showing shapes of second spacers of the valve main body according to the present exemplary embodiment.

An upstream side end portion (another end portion) of the compression coil spring 90 is tightly fitted and attached to an outer periphery face of the small circular tube portion 95C. Thus, the moving portion 95 is supported at the main body portion 94 via the compression coil spring 90 to be movable in the exhaust direction, and the moving portion 95 is continuously urged toward the upstream side by urging force of the compression coil spring 90. As shown in FIG. 13A, each second spacer 95B is formed in a substantially rectangular shape as seen in a direction intersecting the axial direction of the circular tube portion 97. A protrusion height of the second spacers 95B from the ring portion 95A is set to at least 2 mm.

As shown in FIG. 7 to FIG. 11, a ventilation membrane 93 with a circular shape is provided at a wall face of the ring portion 95A that faces to the upstream side. The ventilation membrane 93 is capable of closing off an aperture portion 95S of the ring portion 95A (an outer diameter of the ventilation membrane 93 is greater than an inner diameter of the aperture portion 95S of the ring portion 95A). The ventilation membrane 93 is constituted such that air is allowed to pass through the ventilation membrane 93 but gases such as carbon monoxide and the like are not allowed to pass through. An O-ring 93A at the diameter direction outer side of the ventilation membrane 93 is attached to the wall face of the ring portion 95A. A further O-ring 94A is tightly fitted and attached to an outer periphery face of the main body portion 94.

In a state in which the O-ring 94A provided at the outer periphery face of the main body portion 94 is caused to contact the inner periphery face of the annular wall portion 86 of the cover body 82 with a predetermined pressure, the valve main body 92 is inserted into the inner side of the cover body 82 and the main body portion 94 is fixed at the annular wall portion 86. The O-ring 93A that is provided at the wall face of the ring portion 95A facing to the upstream side is caused by the urging force of the compression coil spring 90 to contact the wall face of the insertion wall portion 84 of the cover body 82 facing to the downstream side (the wall face at the diameter direction outer side of the penetrating hole 84A) with a predetermined pressure, coaxially with the circular tube portion 83.

When pressure inside the case 20 (internal pressure) is at or above a threshold value due to gas exhausted from the battery cells 14 filling the interior of the case 20, the moving portion 95 is pushed by the gas and moves toward the downstream side in opposition to the urging force of the compression coil spring 90. Thus, as shown in FIG. 11, a flow path Fp for the gas is formed between the cover body 82 and the moving portion 95 (the ring portion 95A).

Figure 7:
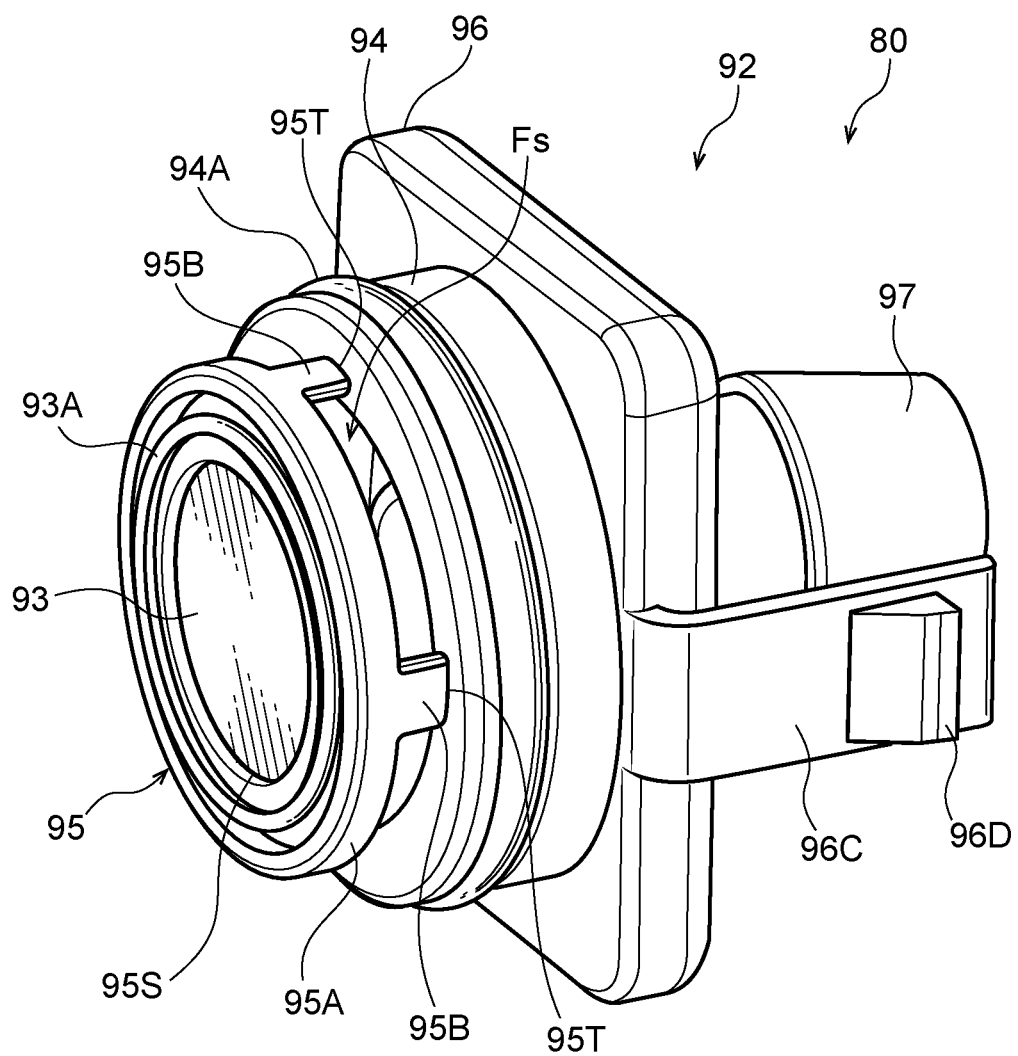
FIG. 7 is a perspective view showing a valve main body structuring the check valve according to the present exemplary embodiment.
Figure 10:
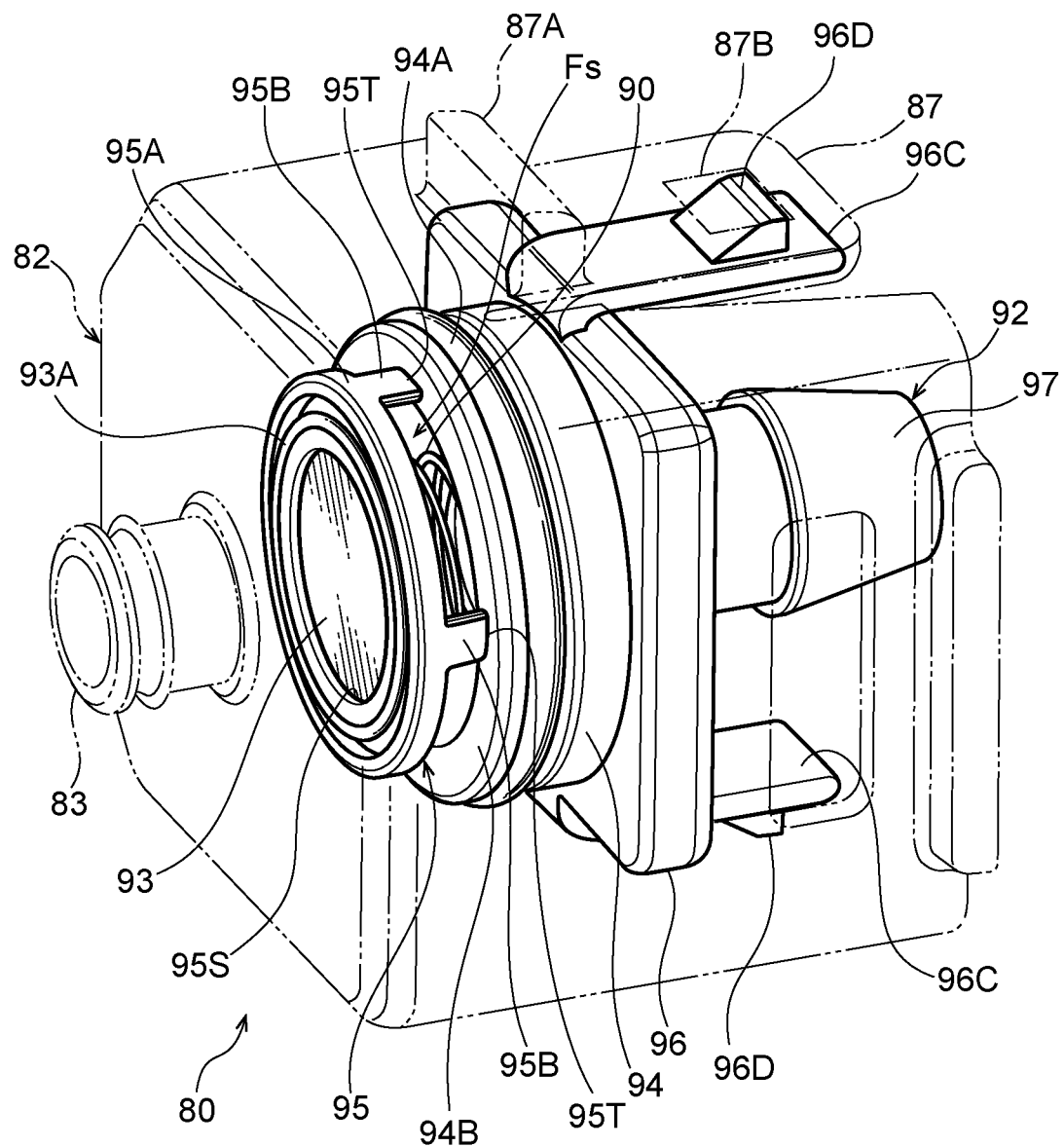
FIG. 10 is a perspective view showing a state in which the valve main body of the check valve according to the present exemplary embodiment is open.
Figure 11:
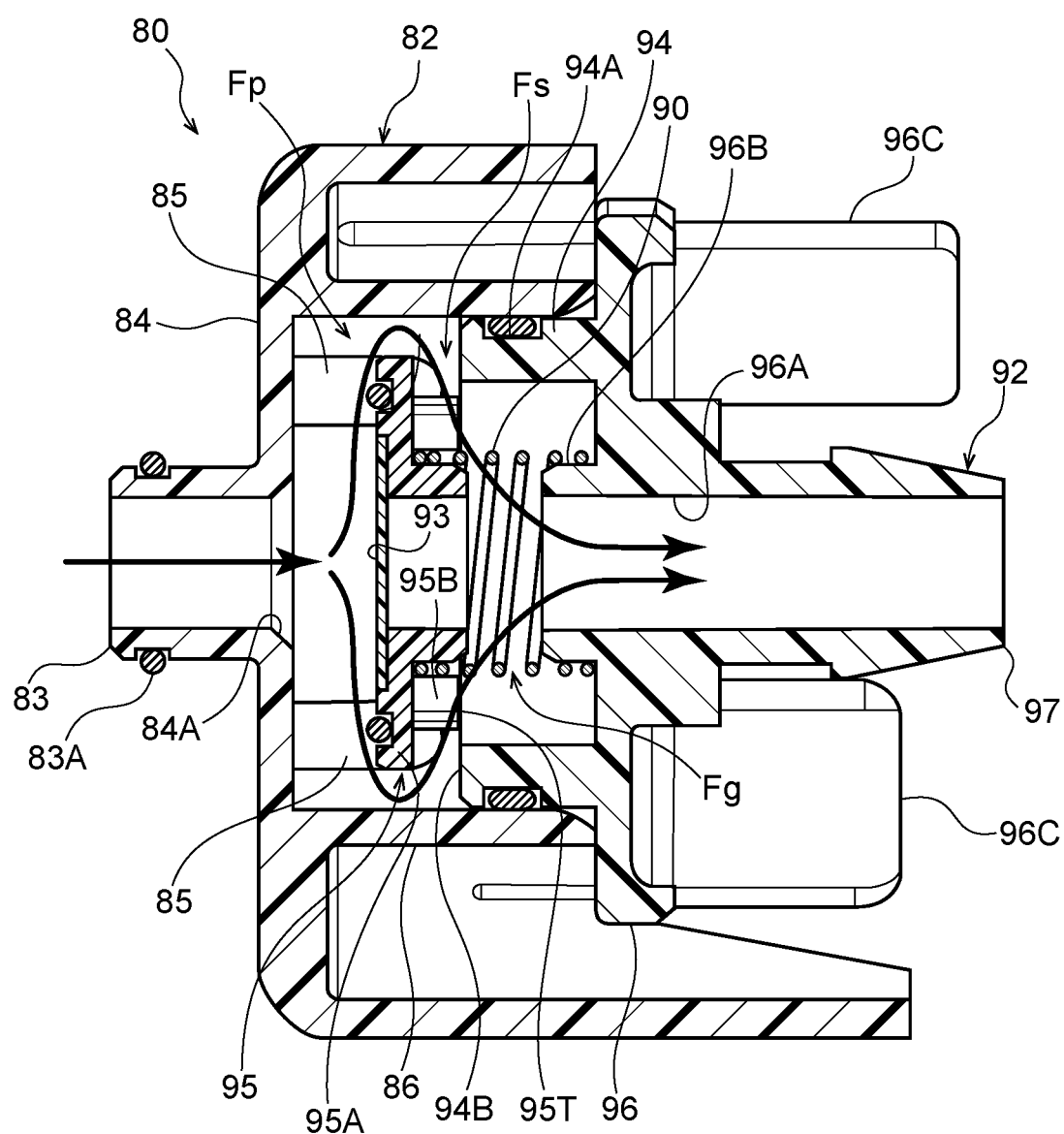
FIG. 11 is a sectional view showing the state in which the valve main body of the check valve according to the present exemplary embodiment is open.

As shown in FIG. 7, FIG. 10 and FIG. 11, when the moving portion 95 moves toward the downstream side in opposition to the urging force of the compression coil spring 90, distal end faces 95T of the second spacers 95B abut against an end face 94B of the main body portion 94 that faces to the upstream side. Thus, the movement of the moving portion 95 toward the downstream side is limited by the distal end faces 95T of the second spacers 95B abutting against the end face 94B of the main body portion 94. As a result, a plural number of slit-shaped interstitial flow paths Fs are formed between the second spacers 95B. The interstitial flow paths Fs are in fluid communication with the flow path Fp.

Now, operation of the vehicle 10 according to the present exemplary embodiment that is provided with the check valve 80 structured as described above is described.

Figure 8:
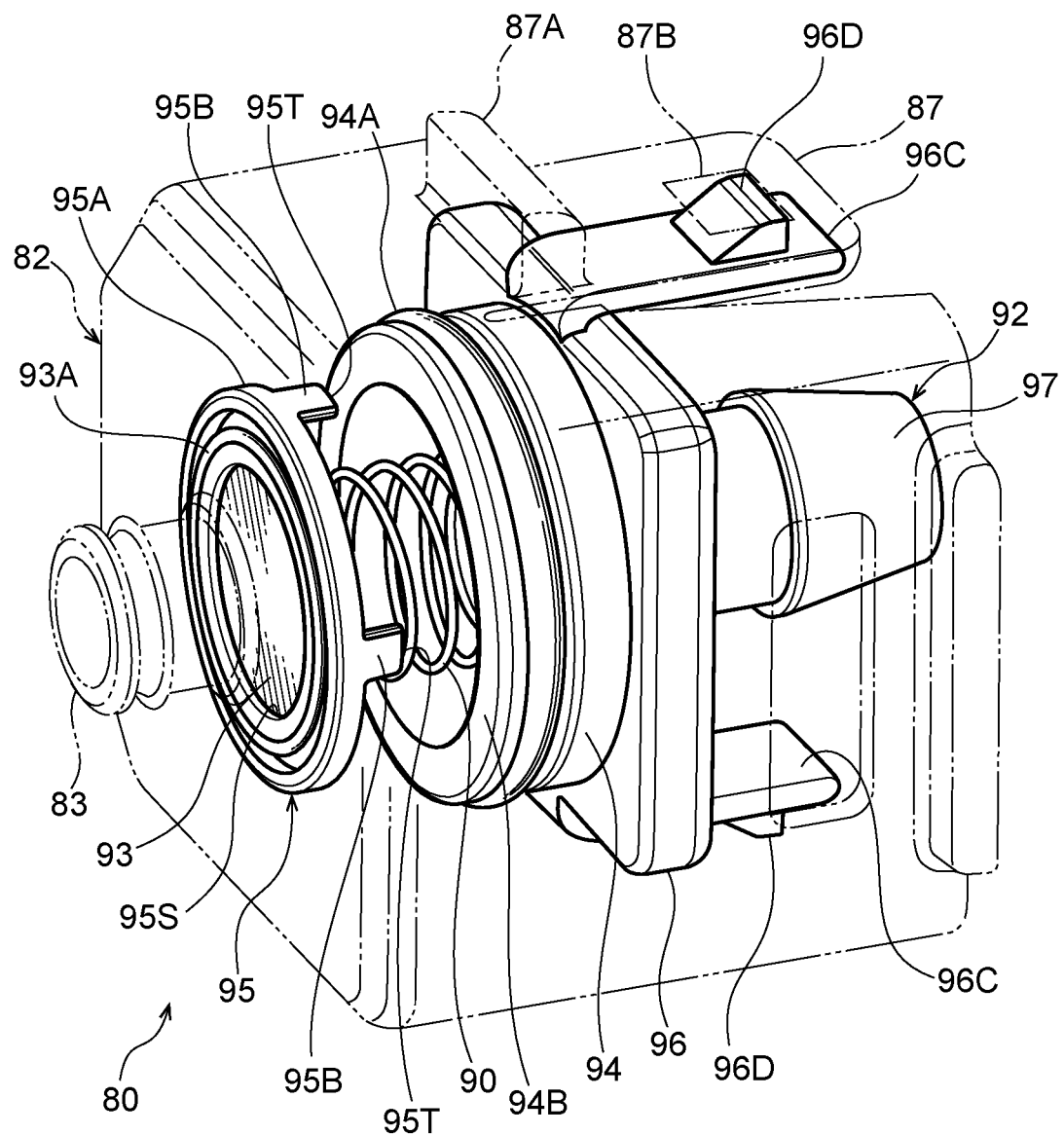
FIG. 8 is a perspective view showing a state in which the valve main body of the check valve according to the present exemplary embodiment is closed.

As shown in FIG. 8 and FIG. 9, at usual times (when gas is not being discharged from the battery cells 14), the moving portion 95 is urged toward the upstream side by the urging force of the compression coil spring 90, and the O-ring 93A is caused by the urging force to contact the wall face of the insertion wall portion 84 facing to the downstream side. That is, the moving portion 95 is disposed such that the ventilation membrane 93 closes off the penetrating hole 84A of the insertion wall portion 84.

In contrast, when gas is discharged from the battery cells 14 due to abnormal heating, air in the case 20 is pushed by the gas and exhausted through the ventilation membrane 93. Then, when the gas fills the interior of the case 20 and the pressure inside the case 20 (internal pressure) is at least the threshold value, the check valve 80 is opened by the pressure of the gas. That is, as shown in FIG. 10 and FIG. 11, the moving portion 95 moves toward the side thereof at which the main body portion 94 is disposed (the downstream side) in opposition to the urging force of the compression coil spring 90.

More specifically, because the gas does not pass through the ventilation membrane 93, the gas passing through the circular tube portion 83 of the check valve 80 pushes the ventilation membrane 93 (the ring portion 95A) toward the downstream side, moving the moving portion 95 toward the downstream side in opposition to the urging force of the compression coil spring 90 until the distal end faces 95T of the second spacers 95B abut against the end face 94B of the main body portion 94. Thus, a flow path for the gas from the circular tube portion 83 to the circular tube portion 97 is formed.

That is, the gas flowing into the circular tube portion 83 in the exhaust direction passes along the flow path Fp formed at the diameter direction outer side of the moving portion 95 (the ring portion 95A), at the diameter direction inner side of the annular wall portion 86, passes along the interstitial flow paths Fs between the second spacers 95B and along a flow path Fg between the small circular tube portion 95C and the small circular tube portion 96B (the space in which the compression coil spring 90 is disposed), and flows into the circular tube portion 97.

Thus, subsequent to the flow path Fp formed between the cover body 82 and the moving portion 95, the gas flowing into the circular tube portion 83 in the exhaust direction passes through the interstitial flow paths Fs that are in fluid communication with the flow path Fp, meaning the slit-shaped (small-aperture) flow paths between the second spacers 95B, and flows to the circular tube portion 97.

Therefore, while a rise in pressure inside the case 20 is restrained, a loss of pressure required for exhausting the gas is suppressed. That is, both cracking of the case 20 that is fabricated of resin by pressure of the gas may be prevented and the check valve 80 may be stably opened by pressure in the case 20. After the opening (when the pressure in the case 20 falls again), a flow path for the gas may be assured in a state in which a pressure loss due to the gas flowing out is suppressed.

Hence, the gas flowing into the circular tube portion 97 passes along the exhaust pipe 98 and is smoothly exhausted through the grommet 99 to the exterior of the vehicle. Because the urging member is structured by the compression coil spring 90, a spring constant (the urging force) may be specified easily, and the moving portion 95 may be moved (opened) stably even when the pressure in the case 20 is lowered.

When the moving portion 95 moves to the downstream side, the outer periphery end face of the ring portion 95A is guided by the plural (four) first spacers 85 that are formed equidistantly in the peripheral direction. Therefore, pressure acts uniformly on the outer periphery end face of the ring portion 95A from the diameter direction outer side thereof, and the moving portion 95 (the ring portion 95A) does not tilt relative to the axial direction (the exhaust direction) of the check valve 80 (the circular tube portions 83 and 97). Thus, the moving portion 95 may move precisely along the axial direction. That is, according to this structure, the flow path Fp for the gas is formed precisely between the cover body 82 and the moving portion 95.

Further, as shown in FIG. 12A, because the first spacers 85 are formed in substantially semicircular shapes in the sectional view seen in the exhaust direction, the outer periphery end face of the ring portion 95A only comes into contact with tip portions of the circular arc faces of the first spacers 85. That is, the outer periphery end face of the ring portion 95A makes line contact with the first spacers 85 along the axial direction. Therefore, friction (sliding resistance) of the outer periphery end face of the ring portion 95A against the first spacers 85 is lower than in a structure in which the ring portion 95A makes area contact. Thus, the moving portion 95 may move to the downstream side smoothly.

Figure 12B:
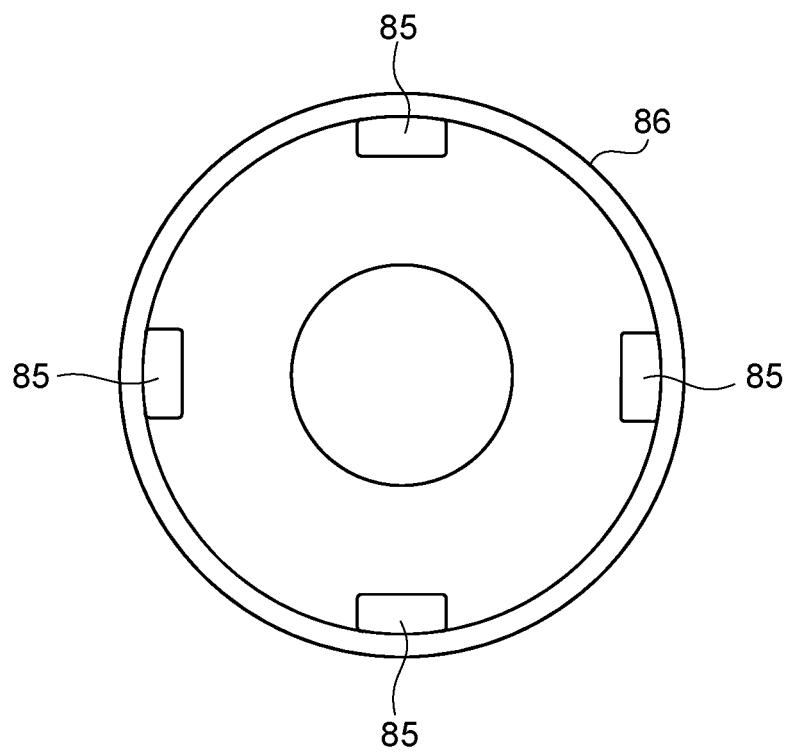
FIG. 12B is a schematic view showing cross-sectional shapes of first spacers of a cover body according to a variant example of the present exemplary embodiment.

Moreover, when the first spacers 85 are formed in the substantially semicircular shape in the sectional view seen in the exhaust direction, as shown in FIG. 12A, a cross-sectional area of the flow path Fp for the gas that is formed between the cover body 82 and the moving portion 95 may be increased compared to a structure in which the first spacers 85 are formed in rectangular shapes in the sectional view seen in the exhaust direction. However, if the first spacers 85 have rectangular shapes in the sectional view seen in the exhaust direction, as shown in FIG. 12B, the first spacers 85 (and the cover body 82) are easier to mold than in the structure in which the first spacers 85 are formed in the substantially semicircular shapes in the sectional view seen in the exhaust direction.

Figure 13B:
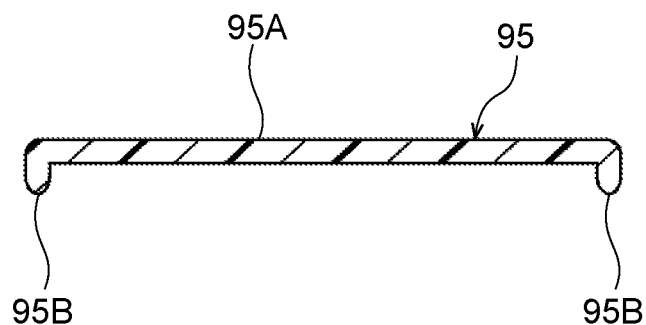
FIG. 13B is a schematic view showing shapes of second spacers of a valve main body according to a variant example of the present exemplary embodiment.

As shown in FIG. 13A, the second spacers 95B are formed in rectangular shapes as seen in the directions intersecting the exhaust direction, and the distal end faces 95T are formed as flat surfaces. Therefore, in contrast to a structure in which, as illustrated in FIG. 13B, the distal end faces 95T of the second spacers 95B are formed in substantially semicircular shapes as seen in the directions intersecting the exhaust direction, the distal end faces 95T of the second spacers 95B may be put into area contact with the end face 94B of the main body portion 94. Consequently, an abutting attitude of the moving portion 95 against the main body portion 94 when the moving portion 95 has moved to the downstream side may be made more stable.

The projection height of the second spacers 95B to the downstream side is set to at least 2 mm, and the moving portion 95 is structured such that a movement stroke thereof to the downstream side is relatively short. Therefore, the moving portion 95 is even less likely to tilt relative to the axial direction (the exhaust direction) of the check valve 80 (the circular tube portions 83 and 97), and the moving portion 95 may move precisely along the axial direction.

The movement stroke of the moving portion 95 to the downstream side is short and, as described above, the slit-shaped interstitial flow paths Fs with small apertures are formed partway along the flow path of the gas from the circular tube portion 83 to the circular tube portion 97. Therefore, the check valve 80 may be reduced in size, in addition to which pressure loss in the case 20 may be restrained further (and the gas may be exhausted smoothly).

If, as shown in FIG. 13B, the distal end faces 95T of the second spacers 95B are formed in substantially semicircular shapes as seen in the directions intersecting the exhaust direction, then cross-sectional areas of the interstitial flow paths Fs formed between the second spacers 95B may be increased compared to the structure in which, as shown in FIG. 13A, the distal end faces 95T of the second spacers 95B are formed in the rectangular shapes as seen in the directions intersecting the exhaust direction.

The ventilation membrane 93 that is permeable to air but impermeable to the gas is provided at the aperture portion 95S of the ring portion 95A of the moving portion 95. Therefore, while the pressure in the case 20 is less than the threshold value, air in the case 20 is smoothly exhausted through the ventilation membrane 93 by gas exhausted from the battery cells 14 (the air is pushed by the gas).

Then, when the pressure in the case 20 is at or above the threshold value due to the gas being exhausted from the battery cells 14, the gas passes through the interstitial flow paths Fs formed between the second spacers 95B. A reverse flow through the ventilation membrane 93 into the case 20 of the gas that has passed through the interstitial flow paths Fs is prevented.

As described above, the connecting portion 46 that connects the left-and-right direction central portions of the front arm 42 and rear arm 44 of the venting plate 40 is disposed between the left-and-right direction central portion of the upper end portion of the front wall 32 and the left-and-right direction central portion of the upper end portion of the rear wall 34. Thus, the connecting portion 46 functions as a bracing rod between the upper end portion of the front wall 32 and the upper end portion of the rear wall 34.

Therefore, even though the case 20 is fabricated of resin rather than metal, strength with respect to an external force (a load) applied in the front-and-rear direction (the thickness direction of the battery cells 14) may be improved. Thus, when a collision load in the front-and-rear direction is applied to the battery pack 10 equipped with the case 20 fabricated of resin, collision resistance (load withstand performance) may be assured.

As described above, the engaging portions 52 of the cover member 50 are engaged with the pawl portions 48 of the connector module 60 that is positioned relative to the case 20. Therefore, compared to a structure in which, for example, the connecting member 25 is disposed at the upper side relative to the connector module 60 and engaging portions are engaged with pawl portions formed at the connecting member 25 (the case 20), the height of the case 20 may be reduced by an amount corresponding to the height of the connecting member 25. In other words, an increase in height of the battery pack 10 may be suppressed by the pawl portions 48 being formed at the upper end portion of the outer face of the connector module 60, and the battery pack 10 may be reduced in size.

As described above, when the penetrating hole 76A of each second connecting portion 76 is put into communication with the penetrating hole 66A and the female thread portion 64 (when the busbar 70 is being attached to the connector module 60), the pawl portion 78 is inserted into the slit portion 68. Therefore, tilting of the busbar 70 in a direction in which the busbars 70 approach one another may be prevented even when fingers are removed from the busbar 70. Hence, the second connecting portion 76 is connected with the electrode terminal 66 by the bolt 19 being inserted into the penetrating hole 76A and the penetrating hole 66A and screwed into the female thread portion 64. Thus, the operation of screwing in the bolt 19 is easy (ease of operation of the attachment may be improved).

Because the busbars 70 do not tilt in the directions approaching one another, occurrences of short circuits and the like may be prevented and safety may be further assured. Because the tilting prevention portions are constituted by the slit portions 68 into which the pawl portions 78 are inserted, the structure may be made simpler than a structure in which tilting prevention portions are separately provided.

Because the battery stack 12 of the battery pack 10 is an auxiliary power source, if a main power source ceases to function due to a malfunction or the like, the vehicle may be run some distance by the battery pack 10 (the battery stack 12). Therefore, for example, a self-driving vehicle may be moved to a safe location or a location where repair is possible.

Above, the battery pack 10 according to the present exemplary embodiment has been described on the basis of the attached drawings. However, the battery pack 10 according to the present exemplary embodiment is not limited to the illustrated structures; suitable design modifications may be applied within a scope not departing from the gist of the present invention. For example, the battery pack 10 according to the present exemplary embodiment may be mounted not only at self-driving vehicles but also at electric vehicles and the like that can be manually driven.

Further, the plural first spacers 85 may be formed integrally with the outer periphery face of the main body portion 94 rather than the annular wall portion 86 of the cover body 82, equidistantly in the peripheral direction. The plural second spacers 95B may be provided integrally at the end face 94B of the main body portion 94 rather than the outer periphery edge portion of the ring portion 95A, equidistantly in the peripheral direction. Numbers of the first spacers 85 and the second spacers 95B are not limited to the illustrated fours.

What is claimed is:

1. A battery pack comprising:
   a battery stack including a plurality of battery cells arrayed in a thickness direction;
   a housing accommodating the battery stack in a hermetically sealed state; and
   a check valve including a cover body that is attached to the housing and a valve main body that is provided at an inner side of the cover body, the check valve exhausting gas discharged from the plurality of battery cells to outside the housing,
   wherein the cover body includes:
      an insertion wall portion presenting a substantially rectangular flat plate shape,
      a first penetrating hole formed at a central portion of the insertion wall portion,
      a first circular tube portion protruding integrally from a periphery of the first penetrating hole at a wall face of the insertion wall portion that faces to an upstream side, and
      an annular wall portion with a predetermined height being integrally formed at a wall face of the insertion wall portion that faces to a downstream side, the annular wall portion being coaxial with the first circular tube portion,
   wherein the valve main body includes:
      a base portion formed in a substantially rectangular flat plate shape;
      a main body portion fixed at the cover body at the downstream side in an exhaust direction of the gas and presenting a circular tube shape; and
      a moving portion disposed at the cover body at the upstream side in the exhaust direction of the gas, the moving portion being urged by an urging member to separate to the upstream side from the main body portion, and when an internal pressure of the housing is at least a threshold value due to the gas, the moving portion moving to the downstream side in opposition to an urging force of the urging member and forming a flow path for the gas between the cover body and the moving portion, wherein the main body portion includes
a penetrating hole formed in a second central portion of the base portion,
a second circular tube portion integrally provided at a periphery of the second penetrating hole at a wall face of the base portion that faces to the downstream side, and
a first small circular tube portion integrally provided protruding from a wall face of the base portion that faces to the upstream side,
wherein the moving portion includes
a ring portion including a first side in the exhaust direction, the urging member contacting the first side,
a ventilation membrane provided at an aperture portion of the ring portion, the ventilation membrane allowing air to pass therethrough and not allowing the gas to pass therethrough,
a second small circular tube portion protruding integrally toward the downstream side from an inner periphery portion of the ring portion, and
a plurality of stopper portions that extend from the first side, abut against the main body portion, and limit movement of the moving portion to the downstream side, the moving portion forming an interstitial flow path between the stopper portions that is in fluid communication with the flow path,
wherein when the valve main body is attached to the cover body, the first circular tube portion and the second circular tube portion are coaxial, and the first small circular tube portion is coaxial with and in fluid communication with the second circular tube portion, and
wherein the gas flowing into the first circular tube portion passes along a flow path formed at a diameter direction outer side of the ring portion, at a diameter direction inner side of the annular wall portion, passes along the interstitial flow path, and along a flow path between the first circular tube portion and the second circular tube portion, and flows into the second circular tube portion.

2. The battery pack according to claim 1, wherein the cover body includes a guide portion that guides the moving portion to move along the exhaust direction.

3. The battery pack according to claim 2, wherein the guide portion is formed in a substantially semicircular shape in a sectional view seen in the exhaust direction.

4. The battery pack according to claim 1, wherein the stopper portions are formed in rectangular shapes as seen in a direction intersecting the exhaust direction.

5. The battery pack according to claim 1, wherein the battery stack is an auxiliary power source.

6. The battery pack according to claim 1, further comprising a reinforcing member disposed inside the housing, the reinforcing member being formed in a frame shape capable of accommodating the battery stack at an inner side thereof,
wherein a connecting portion extending in the thickness direction is disposed at an upper end portion of the reinforcing member.

7. The battery pack according to claim 1, further comprising:
a side lid portion that closes off an opening portion formed in one side portion of the housing; and
an upper lid portion that closes off an opening portion formed in an upper portion of the housing,
wherein the side lid portion includes an engaged portion with which an engaging portion formed at the upper lid portion engages.

8. The battery pack according to claim 1, further comprising:
a side lid portion that closes off an opening portion formed in one side portion of the housing; and
a busbar that electrically connects an electrode terminal provided at the battery stack with an electrode terminal provided at the side lid portion,
wherein the side lid portion includes a tilting prevention portion that prevents tilting of the busbar at a time of attachment of the busbar.

9. The battery pack according to claim 8, wherein the tilting prevention portion includes a slit portion into which a pawl portion formed at the busbar is inserted.

10. The battery pack according to claim 1, wherein:
the aperture portion is on a second side of the ring portion opposite to the first side in an axial direction of the moving portion.

* * * * *